US010623400B2

(12) United States Patent
Hauw

(10) Patent No.: US 10,623,400 B2
(45) Date of Patent: Apr. 14, 2020

(54) METHOD AND DEVICE FOR CREDENTIAL AND DATA PROTECTION

(71) Applicant: Greg Hauw, Singapore (SG)

(72) Inventor: Greg Hauw, Singapore (SG)

(*) Notice: Subject to any disclaimer, the term of this patent is extended or adjusted under 35 U.S.C. 154(b) by 0 days.

(21) Appl. No.: 14/052,774

(22) Filed: Oct. 14, 2013

(65) Prior Publication Data

US 2015/0106892 A1   Apr. 16, 2015

(51) Int. Cl.
*H04L 29/06* (2006.01)

(52) U.S. Cl.
CPC ........ *H04L 63/0838* (2013.01); *H04L 63/067* (2013.01); *H04L 63/0861* (2013.01)

(58) Field of Classification Search
CPC ... H04L 63/08; H04L 63/0861; H04L 63/083; H04L 63/0838; H04L 63/067
See application file for complete search history.

(56) References Cited

U.S. PATENT DOCUMENTS

| 6,292,896 | B1* | 9/2001 | Guski et al. ............... 713/169 |
| 6,725,370 | B1* | 4/2004 | Sakakura ............ H04L 63/0428 713/155 |
| 2002/0150241 | A1* | 10/2002 | Scheidt ................... H04L 9/321 380/44 |
| 2003/0007640 | A1* | 1/2003 | Harada ................... G06F 21/10 380/270 |
| 2003/0046237 | A1* | 3/2003 | Uberti .................... G06Q 20/02 705/44 |
| 2006/0136740 | A1* | 6/2006 | Smith et al. .................. 713/184 |
| 2007/0107051 | A1* | 5/2007 | Carter ..................... G06F 21/31 726/21 |
| 2007/0245152 | A1* | 10/2007 | Pizano et al. ................. 713/186 |
| 2008/0123843 | A1* | 5/2008 | Machani ........................ 380/44 |
| 2009/0183008 | A1* | 7/2009 | Jobmann ............... H04L 9/0866 713/186 |
| 2010/0195824 | A1* | 8/2010 | Lin ........................ H04L 9/0838 380/44 |
| 2010/0280996 | A1* | 11/2010 | Gross, IV ............. G06F 16/188 707/649 |
| 2011/0047377 | A1* | 2/2011 | Allen .................... H04L 9/0866 713/168 |
| 2011/0271279 | A1* | 11/2011 | Pate ........................ G06F 21/53 718/1 |
| 2012/0185698 | A1* | 7/2012 | Fiske ............................ 713/186 |
| 2012/0210265 | A1* | 8/2012 | Delia et al. ................... 715/771 |
| 2013/0145085 | A1* | 6/2013 | Yu et al. ....................... 711/103 |
| 2013/0159699 | A1* | 6/2013 | Torkkel ............... G06F 21/6245 713/155 |
| 2014/0082376 | A1* | 3/2014 | Roden ................. H04L 67/1097 713/193 |
| 2014/0164776 | A1* | 6/2014 | Hook ....................... H04L 9/14 713/171 |

* cited by examiner

*Primary Examiner* — Cheng-Feng Huang
(74) *Attorney, Agent, or Firm* — Michael L. Harrison

(57) ABSTRACT

A security method and system for capturing user specific binary information used to identify the user; using the user specific binary information to generate a secured primary code, generating strong user credentials for accessing web based or applications logins, intercepting credential requests from local applications or remote web sites, regenerating strong user credentials dynamically, using the secure primary code to generate encryption keys for protection of data inside or outside the machine of creation, and using secure primary code protection in conjunction with subsidiary key exchanges to allow data sharing while retaining data security.

9 Claims, 4 Drawing Sheets

METHOD AND DEVICE FOR CREDENTIAL AND DATA PROTECTION

FEDERALLY SPONSORED RESEARCH OR DEVELOPMENT

Not Applicable

FIELD OF THE INVENTION

The present invention relates to computer and network security, and in particular to software, methods, systems and devices for securing data and logins without requiring storage of any associated credentials by the securing party either locally, or on a network connected system.

BACKGROUND OF THE INVENTION

With widespread adoption of the Internet, and a changing paradigm away from centralized computing towards distributed computing, the evolution of private and public "clouds" has occurred. These clouds allow for data storage, application access, and computational processing to be made available beyond the logical network boundaries of a conventional educational, business, or government entity. Furthermore, a rapidly expanding trend towards the use of personal computing hardware within the professional sphere (often referred to as "bring your own device" or BYOD) has significantly exacerbated the movement of corporate data and computational assets beyond the boundaries of the company's internal network firewall.

These external systems require authentication in order to provide secured services. In the prior art, these systems require retention of the credential (typically a password) by the authenticating agent (typically a user). Considerable risk existed in the compromise of a password, initially via interception during transmission (snooping attacks) but eventually by more sophisticated attacks including brute force password guessing, social engineering attacks like phishing which encourage the user to provide their credential directly to an attacker, or interception at a lower level (for instance via keyboard logging).

The inherent security weaknesses in the prior art credential and password systems have been significantly increased by password reuse across multiple target systems, and by the use of weak passwords—both attempts by users to make credentials easier to remember and use. As a result, these credentials in the prior art are easier to compromise, and compromises lead to a much greater impact than a single target system.

Many enhancements to the base prior art have been attempted with both success and associated drawbacks. For instance, to mitigate user attempts to use easy-to-remember but also easy-to-compromise passwords, target systems have enforced password "policy" which specifies the length, number of different character types to be used, checks against dictionaries to prevent use of common words, and other characteristics. When implemented, these policies have decreased the ability of passwords to be compromised through a number of common password guessing algorithms; however, at the cost of making these credentials less easily remembered by end users. This has resulting in increased reuse of complex passwords (so that only one such cryptic password must be remembered), and an increase in storage of passwords in other easily compromised mediums (such as a paper notes, files on computer storage, or notes in mobile devices).

In an attempt to manage increasingly complex passwords across a spectrum of target systems, password management systems have evolved in the prior art. These systems store passwords in some secured method, and can then be used by the user to retrieve the password and provide it to a given target system. These systems improve greatly on non-secured storage, but since they are a store, compromise of the store effectively grants an attacker access to all passwords. This is especially true when the store is located in "the cloud"—where it can be accessed by a number of user devices, but also where it is more vulnerable to attackers from the network at large.

The prior art also includes "multi-factor authentication"—under this scheme, users are required to provide two or more pieces of information from something the user knows (typically a password), something the user is (biometrics like a fingerprint or retinal scan), and something the user has (typically physical devices with non-compromisable or changing data such as time based security tokens). Although multi-factor authentication addresses many security problems solely by making compromise of the password alone insufficient to gain access to the target system, uptake within the general population has been slow due to general unavailability of biometrics on a large scale, and complexity, ease-of-use, and cost concerns around use of physical devices.

The second set of challenges in the prior art revolves around data security, on the device and in the cloud.

Historically, data was kept on a single physical device, and simply limiting access to that device ensured the integrity of the data. As the trends identified earlier have advanced, two fundamental changes have occurred. First, devices that were previously fixed and could be secured through physical environment measures (facility security, guards, locks) are now mobile, subject to theft during transport, and often stored in non-secure environments (for example, a worker's home). Second, data that was previously stored on only a single device is now being propagated on a massive scale to other devices—either directly from device to device, or indirectly through cloud based storage. In cases of cloud based storage, this data is generally retained on the cloud service itself which yields another copy of the data, on an open network, which can be attacked and stolen by anyone able to breach the cloud service provider's network security.

Prior art approaches to resolving this problem have focused around data loss prevention, primarily by locking down the ability of individual users to move data off the single allowed physical device. This is typically achieved through monitoring routes off the machine, including applications that use the network (e.g. email, messaging programs, and file transfer programs) and physical devices (USB connected devices, removable hard drives, and other media). Typically, low level device drivers intercept calls to these programs and devices, analyze the content being sent, and selectively allow or disallow the operation in order to prevent unauthorized data movement.

However, this type of control cannot be applied to situations where cloud storage has been allowed. By definition, cloud storage means moving the data off the single physically protected machine asset into an environment that is accessible to many individuals. In the existing prior art, data protection in this environment has been achieved through two methodologies—first, simply relying on the physical and network security of the cloud provider. The second approach is to bring cloud storage within the confines of the enterprise—so that the cloud storage hardware can be secured and managed like any other corporate asset.

All prior art attempts to mitigate the security risks associated with data loss have not been completely satisfactory. The advent and rise of cloud storage, and the associated ability to have centralized data accessible from all of a single user's devices has made the choice of simply not embracing cloud storage, by and large, a non-option. Once the cloud choice has been made, it is desirable to use existing commercial cloud solutions—leveraging the specific skills of enterprises whose core business is to provide cloud solutions. However, it is unacceptable to exercise no direct control over the security of one's own data.

The third set of challenges revolves around successful collaboration and sharing of data.

Notwithstanding the risks of exposure of data when it has moved from a single, secured source, there are significant advantages to controlled sharing of data between multiple parties. For example, it allows the members of a team to collaborate on work; it allows suppliers and their customers to work more closely and quickly together; and it allows parties to a business transaction to quickly move through lengthy documentation reviews and reach agreement.

Prior art solutions to this problem have focused directly on the need to share between parties. All cloud providers allow sharing of documents stored in their solution, typically by either URL link, email attachment, or by allowing other participants to directly access the underlying cloud provider store.

The security implications of sharing have largely been ignored as they run counter to the openness of sharing. Instead, cloud providers have implemented security by either not sharing, or by asking the user to manage their own security (by limiting who they send links to, or by adding and removing people from an allowed list of accessors).

Furthermore, a fundamental problem with these three sets of challenges is that they interact with each other. Solving one problem often results in increasing the intensity or frequency of one of the other problems. For example, preferred methods to solve password problems often result in systems that are not easily mobile or usable across networks, preferred methods to make systems more secure tend to limit the ability to share with others, and systems that result in the highest level of sharing between parties are often easily compromised due to their inherently open nature.

As a result, the current state of art includes a vast number of target systems which user authentication primarily via complex passwords and the fragmented use of password management systems to store these passwords in centralized repositories on behalf of the user. Consequentially, continued challenges exist around controlling social engineering attacks, protecting password stores that contain many passwords, and pervasive credential reuse between multiple target systems.

Adoption of bring-your-own-device (BYOD) and cloud storage is widespread with their passwords adding to the challenges of credential management. Data in the cloud is most likely protected by individual passwords that may be reused or of dubious strength.

Enterprises require collaboration, within their teams, and even with external parties—but are at the whim of the cloud storage providers to implement all their security.

What is needed is a unified method and system that provides login protection (via high grade credentials) and data protection (via encryption) without limiting sharing, and without creating a credential or encryption key storage either on the user's device or in a centralized (cloud or enterprise) server.

BRIEF SUMMARY OF THE INVENTION

It is an object of the present invention that credentials are generated which secure both logins and data.

It is a further object of the present invention that credential data is not stored on either the local system or a remote centralized repository (in the cloud).

It is another object of the present invention that credential data used by third parties is generated in a complex form that contains character combinations or is of sufficient length to prevent memorization, social attacks, dictionary attacks, and brute force guessing.

It is yet another object of the present invention that the generated credentials are passed directly to the requiring system or application without requiring user intervention or knowledge.

It is yet another object of the present invention that securitization of login and data relies on a multi-factor scheme, using a combination of something the user has, something the user knows, and something the user is.

It is yet another object of the present invention that it does not output an error condition, but instead appears to successfully generate user credentials when invalid user provided data is provided. This further increases the difficulty of brute force attacks or guessing of passwords since there is no visible indication that provided input is incorrect.

It is yet another object of the present invention that data security is maintained while allowing collaboration and sharing between the data owner and other parties.

It is yet another object of the present invention that the data owner maintains data security directly when data is stored in a centralized location (e.g. in the cloud).

It is yet another object of the present invention that compromise of the cloud storage provider's security does not allow access to securely protected data.

It is yet another object of the present invention that access by employees of a cloud storage provider is prevented when data is stored in the cloud service.

The present invention embodies a method and system for securing the logins and data of an individual or enterprise's assets while allowing use of centralized, network (cloud) storage, and collaboration with internal and external parties. The preferred embodiment comprises capturing user specific information used to identity the user, using the user specific information to generate a secured primary code, generating strong user credentials for accessing web based or application logins which are not stored (either locally or in a centralized, third party store), intercepting credential requests from local applications or remote web sites, determining the domain of the credential requester, regenerating the strong user credentials dynamically and passing them transparently to the credential requester, using the secured primary code to protect data inside and outside the machine of creation, and using the secured primary code protection in conjunction with subsidiary key exchanges to allow data sharing while sustaining data security.

BRIEF DESCRIPTION OF THE DRAWINGS

The above and numerous other objects of the inventions that may be achieved by the preferred embodiment of the invention will be more readily understood from the following detailed description and the appended drawings wherein.

DETAILED DESCRIPTION OF THE INVENTION

Figure 1:
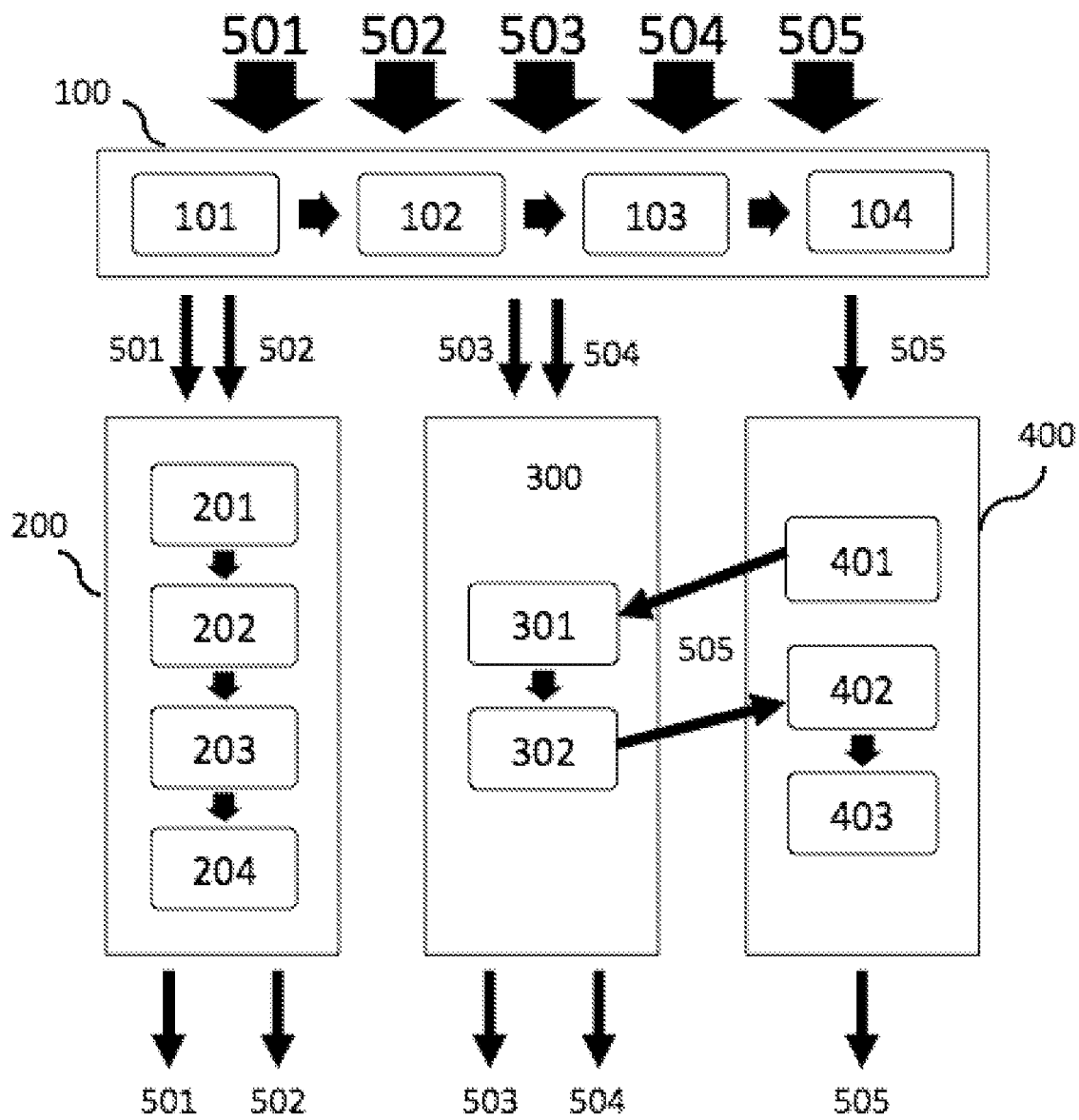
FIG. 1 is a flowchart of the method of the present invention.

FIG. 1 shows a flowchart for the method of the present invention. The invention comprises four high level flows: an initialization flow 100, a credential generation flow 200, a data protection flow 300, and a data sharing flow 400. The primary capabilities of the process are exercised by combining initialization flow 100 and one or more of the other three capability flows.

For each capability, initialization flow 100 is required. In initialization flow 100, user data collection step 101 is first performed. During user data collection step 101, data that is specific to the user is collected and converted into binary representation if required. The present invention allows a variety of user specific data including fingerprints, retinal scans, remembered passphrase, and other biometric or knowledge based data. For data that is analog in nature, user data collection step 101 includes expressing analog data in a binary form. This step satisfies either the "what a user is" or "what a user knows" condition of multi-factor authentication.

After user data collection step 101, the collected data is processed through algorithmic transformation step 102. In this step, an algorithm F acting on binary data d is chosen such that:

$$F(d) \rightarrow x$$

This transformation algorithm is used to bring the data into proper form for the next step, to obscure the content of the data, and to ensure the integrity of the input data, typically through the computation of check bits, data restructuring or reordering, and similar operations. This algorithmic manipulation of the data prevents easily reusing data d in order to regenerate x outside of the instance of the present invention used to originally generate x.

If this is the first time the process has been executed, then after algorithmic transformation step 102 has generated x, code generation step 103 is used to generate a primary code for further use in the process. A primary code y is generated using any reasonable methods that result in random values. This primary code is passed from initialization flow 100 to all subsequent flows. After generation of code y is complete, then a two-way algorithmic transformation G is completed using the random primary code y and the transformed data x to generate an protected secure code z:

$$G(x,y) \rightarrow z$$

This protected secure code z may be used to regenerate primary code y using the inverse function of G:

$$G^{-1}(x,z) \rightarrow y$$

The protected secure code z has the characteristics that it can be used to generate the original primary code y but only when the transformed data x is also available. Since the system stores only secure protected code z and neither primary code y nor transformed data x, this means that primary code y must be regenerated before each use.

If this is the second or later time the process has been executed, then after algorithmic transformation step 102 has generated x, protected code z is retrieved from storage, and the function $G^{-1}(x,z)$ executed in order to regenerate primary code y.

At the end of initialization flow 100, primary code y is available for further operations in memory.

The first significant function of the system is to generate credentials for authentication to either a web site or a locally executing application. After completing initialization flow 100, in credential generation flow 200, data collection step 201 is first performed. As part of data collection step 201, the following information is collected by the system: domain, time information, and sequence information.

Domain information is information about the web site or application that is requesting the credential. This may include identifying information for the requester (e.g. website URL, application name, process identifier) or identifying information for the user in the context of the requester (e.g. username, user address, user identifier), or a combination of both. The domain information should be able to be regenerated on demand for the given user and website/application combination. This domain information is captured in a data structure p.

In algorithmic transformation step 202, an algorithm H is chosen such that:

$$H(p,y) \rightarrow v$$

where y is the primary code generated in initialization flow 100, p is the domain information data structure generated in data collection step 201, and v is a domain specific credential data pool containing multiple data elements which can be used to create a single credential.

Algorithm H has the characteristics of being deterministic (meaning that first and subsequent evaluation of H(p,y) will always render the result v), one-way such that H(p,v) does not evaluate to y, and has a low incidence of collision where multiple values of p or y result in the same value v. Examples of algorithms that could be selected that meet these criteria include salted hashes (particularly minimal perfect hashes), encryption transformation, and other combination salted key determination functions.

After creation of the domain specific credential data pool in algorithmic transformation step 202, the credential data pool is manipulated in credential policy enforcement step 203. During credential policy enforcement step 203, specific rules are applied to select individual elements from the credential data pool and then these elements are combined into a single credential. The credential policy enforcement step 203 is also deterministic—performing the process with the same data inputs will yield the same single credential. Specific rules can specify, for example, the length of the credential (number of elements to be chosen), the type of elements to be chosen (for example, uppercase alphabetic, lowercase alphabetic, numeric, special characters) or sequencing checks of credentials.

Individual credential elements chosen according to credential policy rules in credential policy enforcement step 203 are combined into a single authentication credential in credential combination step 204. This single authentication credential can then be used to authenticate to the desired web site or local application by manually presenting it. Alternatively, it is within the scope of the present invention to automatically present the single authentication credential to the requester without requiring user involvement.

This single authentication credential is created dynamically by the system without storage of the authentication credential itself, or of any elements that are direct inputs in the authentication pool generation algorithm H. This prevents compromise of the credential by compromising any of the storage that the complete embodiment of the present invention is using. Furthermore, credential generation is sensitive to the identity of the requester (website or application), and ensures that credentials generated are different between each requester. Additionally, in cases when the credential is passed directly to the credential requester, the user does not have knowledge of the credential, and thus negates social engineering attacks, phishing, and theft.

The second significant function of the system is to provide secure protection and confidentiality for structures (including both at rest files and in motion data streams). After completing initialization flow 100, in data protection flow 300, steps are provided which dynamically generate an encryption key which may be used to encrypt or decrypt the data using standard cryptographic methodologies such as Triple DES or AES. The encryption key is dynamically generated when required for either encryption or decryption, and as such is not stored on any system (either locally or in the cloud) nor transmitted along with stored files, and thus not subject to interception or manipulation attacks.

After the completion of initialization flow 100, the primary code y has been generated and is available for further use in the process. In encryption key generation step 301, an algorithm J is chosen such that $$J(y,r) \rightarrow u$$

where y is the primary code from initialization flow 100, and u is the data protection encryption key. The algorithm is chosen such that it transforms based on other parameters r including information specific to the user and function being performed as well as sequencing information. This combination provides the ability for a user to decrypt documents on multiple devices as long as the user has access to the original primary code y.

In data coding step 302, the data protection encryption key u is used to either encrypt (for writing) or decrypt (for reading) an at-rest file or an in-motion data stream. The data can then be either stored to a device (writing) or opened in any standard application for use (reading).

The present invention allows either the use of a single data protection encryption key u for all files in a system or subsystem, or the use of file specific data protection keys u which vary based on the file. In the case of using file specific data protection keys, encryption key generation step 301 includes file-specific information in the algorithmic transformation of primary code y.

The third significant function of the present invention is to provide data sharing.

After completing initialization flow 100, in data sharing flow 400, exchange codes step 401 is first performed. In exchange codes step 401, an encryption code is first exchanged with the partner. This can be done either directly or via a third party intermediary. During this step a paired encryption key (such as the public key in a Public Key Infrastructure scheme) is exchanged which allows a sending party to encrypt data using a key which the receiving party may then decrypt using a secret key known only to the receiving party. This exchange codes step 401 is performed for each receiving party with whom the data will be shared.

Once all encryption keys have been received, generate shareable object step 402 is performed. During this step, an encryption key is generated as described in encryption key generation step 301, using file specific data encryption. This ensures that multiple files shared by the same sender with the same recipient do not use the same encryption key, and the compromise of one file's encryption key does not affect the security of other exchanged files. The file is next encrypted as described in data coding step 302.

Once the encrypted file has been generated in generate shareable object step 402, then file and decryptor exchange step 403 is performed. During this step, the encrypted file and the key used to encrypt the file are passed from the sender to any recipients.

There are multiple methodologies for accomplishing this purpose within the scope of the patent, including but not limited to: sending the encrypted file and an encrypted copy of the key separately to each recipient individually, sending the encrypted file and a secondary decryptor file with pieces that can be decrypted by each recipient separately, or sending a single file which includes both the decryptor information and the encrypted data. In the last case, a recipient would decrypt a segment of the file using their shared key (private key in a PKI scheme) to yield the encryption key for the file, which would then be used to decrypt the file contents.

The set of process flows in the current invention, user initialization flow 100, credential generation flow 200, data protection flow 300, and data sharing flow 400 can be combined to create specific process steps for a number of uses within the scope of the present invention, specifically:

Secure Credential Generation process steps 501, which sequentially requires initialization flow 100 followed by credential generation flow 200; wherein a new secure credential is generated for the first time;

Secure Credential Regeneration steps 502, which sequentially requires initialization flow 100 followed by credential generation flow 200; wherein a previously created secure credential is regenerated on demand;

Data Protection steps 503; which sequentially requires initialization flow 100 followed by data protection flow 300; wherein data, either at-rest or in-motion is protected against compromise;

Protected Data Reading steps 504; which sequentially requires initialization flow 100 followed by data protection flow 300; wherein data that is already protected is decrypted and made usable again; and Protected Data Sharing steps 505; which sequentially requires initialization flow 100 followed by data sharing flow 400 (which uses data protection flow 300 in between steps to encrypt data); wherein data is both protected as in Data Protection steps 503 but also done in such a manner that one or more recipients can use the data beyond the original data protector.

Figure 2:
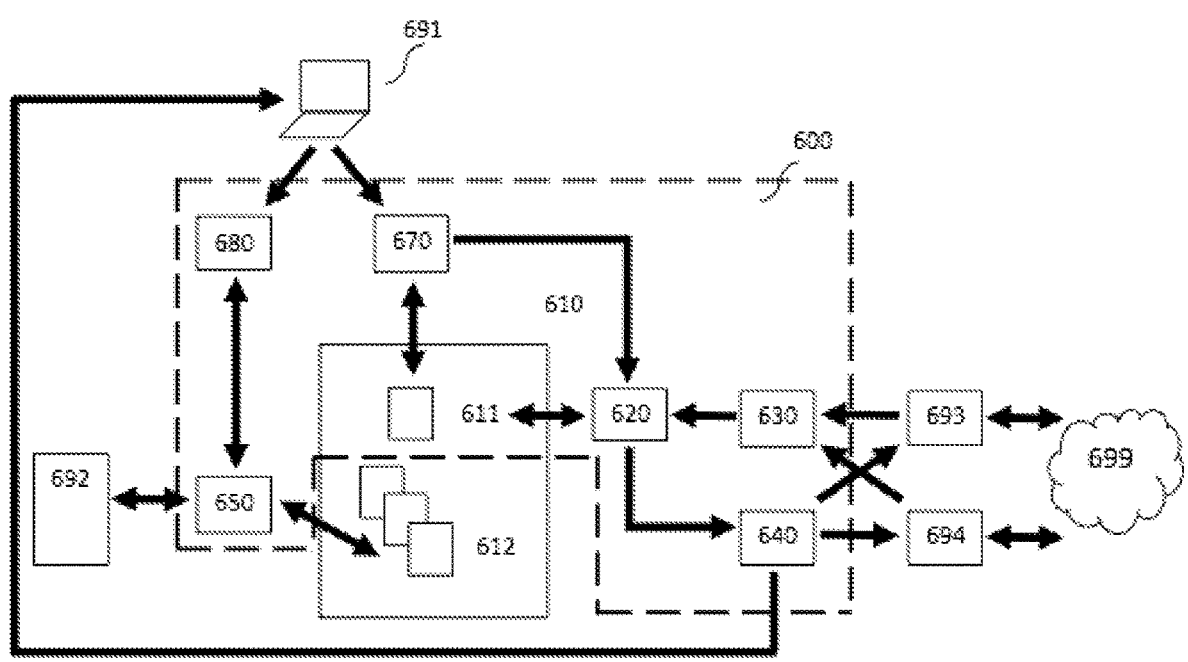
FIG. 2 is a functional block diagram of a security device implementing the method of the present invention.

Referring now to FIG. 2, a functional depiction of one possible implementation of the method of the present invention is disclosed. The present invention 600 is implemented through either software or hardware in a computing device which has a means for user input 691, an operating system 692, a browser 693 or similar means for accessing web sites, local applications 694 that require authentication to remote systems, and a local filesystem 610.

On first execution of the system, user input means 691 is used to provide binary user data to initialization front-end 670. Initialization front-end 670 transforms the binary user data, and computes the protected secure code that is stored on local filesystem 610 in configuration file 611. The primary code is then generated for further use by the system.

On subsequent executions of the system, user input means 691 is used to provide binary user data to initialization front-end 670. Initialization front-end 670 uses the transformed binary user data and the protected secure code stored in configuration file 611 to generate the primary code.

Once initialization front-end 670 completes generation of the primary code, it initializes and readies for operation the other system components: password request interceptor 630 and filesystem interceptor 650.

Under normal operation of the computing device, the user may use a web browser 693 to access sites that require credentials. Password request interceptor 630 intercepts web based forms which request credentials and seamlessly invokes credential generation engine 620 in response.

Credential generation engine 620 identifies the website being access (by URL, domain, or other identifying characteristics) and confirms if credentials are available in configuration file 611. If no credentials are available, then credential generation engine 620 uses identifying information about the website and the user to generate a single authentication credential for the website. This single authentication credential is provided to the user so that the website authentication information may be updated to use the higher-grade security credential. Information required for regeneration of the credential (primarily sequencing information to allow for regeneration of past credentials) is stored in configuration file 611.

On subsequent authentication attempts to the same website, credential generation engine 620 uses identifying information about the website, user, and sequencing to regenerate the same high-grade security single authentication credential. The single authentication credential is passed from credential generation engine 620 to password provider module 640, which seamlessly inserts the credential into the website's authentication page. This allows the system to generate the credential and pass it to the website without user intervention.

If the system has local applications that require remote authentication to services, then the system works as for a website, with password request interceptor 630 detecting local dialogs for credentials and routing information about the application to credential generation engine 620. Credential generation engine 620 creates the single authentication credential and passes it back to the application via password provider module 640.

Password provider module 640 may also detect websites or applications to which it can not provide the credential directly via password provider module 640, and provide the credential to the user for manual entry in those cases.

Filesystem interceptor 650 provides the second primary functionality within the system. Filesystem interceptor 650 sits between device operating system 692 and local filesystem 610, containing data files 612. It ensures that data files 612 are kept in an encrypted state while at rest in local filesystem 610, and that data files 612 are transparently decrypted when needed for use. Filesystem interceptor 650 may be either device driver level software that intercepts all operating system filesystem calls for devices where the filesystem is visible to the end-user, or an independent application on devices where the filesystem is only visible to the end-user in the context of an application.

In either case, when a write operation occurs to a file under management by the system, filesystem interceptor 650 uses the primary code to generate a data protection key for the file, using algorithmic transformation with the primary code and file specific data as input. The data protection key is then used to encrypt the file prior to storage on local file system 610.

When a read operation occurs, filesystem interceptor 650 regenerates the data protection key for the file, and transparently decrypts the file prior to passing it back to the file reader application.

These two operations occur transparently so that applications which depend on file data being in a decrypted form are not aware that the data was encrypted while at rest on local filesystem 610.

Although the present invention operates directly against local filesystem 610, data files 612 may subsequently be moved to another device or to a centralized server, for example a cloud based storage solution. In this case, the data remains protected because the keys used to encrypt data may only be regenerated by the user using the multi-factor authentication system outlined in initialization flow 100. Since decryption keys are not provided with the file, or to a centralized storage service, a compromise of the file storage, including compromise by server administrators (for example the employees of a cloud service provider) does not break the data protection of the present invention.

The last component of the system, file sharing module 680 is invoked through user input 691 when the user wishes to share a file with another user. In this case, the user provides a paired encryption key, either directly, or via an interface that allows selecting paired encryption keys from a library. File sharing module 680 uses the code functionality of filesystem interceptor 650 to generate a file encryption key using the primary code along with information about the file being shared. File sharing module 680 next encrypts the file using the file encryption key, and generates a secure copy of the file encryption key using the paired encryption key. The secure copy of the file encryption key may then be transmitted either as part of the file, a separate file, or a separate transmission.

File sharing module 680 also handles incoming shared files, which comprise an encrypted file and a secure copy of the file encryption key. File sharing module 680 uses the private side of the paired encryption key to decrypt the secure copy of the file encryption key yielding the encryption key. This key is then used to decrypt the encrypted file.

Through the system operation, credential generation engine 620 and filesystem interceptor 650 use the primary code to perform their operations. It is within the scope of the present invention to require credential generation engine 620 and filesystem interceptor 650 to request the primary code from initialization front-end 670 only once (at initialization), upon each use, or periodically. It is also within the scope of the present invention to require initialization front-end 670 to ask for user data (and regenerate the primary code) only once at initialization, upon each use, or periodically over time. This choice allows the software to be configured based on the security characteristics and level of intrusiveness desired. Periodic regeneration mitigates the risk of a device compromise after the primary code has been generated by limiting the duration of the exposure.

Configuration file 611 does not store the authentication credentials, data protection keys, or file encryption keys. These are generated by the system at time of use, and where possible, used without exposing the user to their contents. This limits repository compromise attacks and social engineering attacks (including phishing, guessing, or imposter attacks).

The system is specifically designed to allow credential generation engine 620 and filesystem interceptor 650 to function when the wrong user binary data has been provided. In this case, credentials generated would not be the correct, and decrypted files would not contain valid data. This allows the system to operate in a mode where users are not provided any feedback upon entering invalid user binary data—which prevents brute force attacks.

Figure 3:
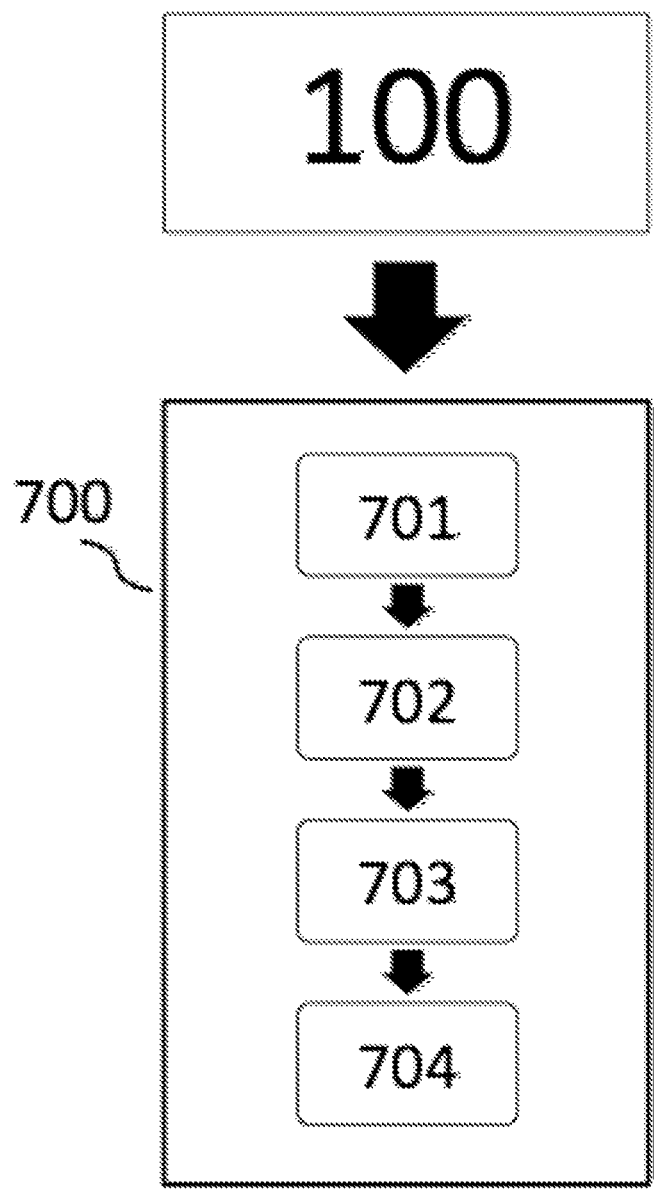
FIG. 3 is a flowchart of the method using the present invention of implementing user data retrieval.

Referring now to FIG. 3, a flow diagram of a user data recovery addition to the present invention is presented, user data recovery flow 700. In initialization flow 100, after using binary user data d to generate the primary code, biometric information collection step 701 occurs. Biometric data is transformed in biometric transformation step 702 yielding password recovery data s. A secure recovery data t is computed such that $$G(s,t) \rightarrow d$$

The system retains secure recovery data t. When password recovery is required, biometric information collection step 701 is performed again, biometric transformation step 702 is then performed to yield password recovery data s. Secure recovery data t is retrieved from system storage in recovery data retrieval step 703. In user data computation step 704, the algorithmic computation is performed resulting in regeneration of the original binary user data d. This binary user data may then be used to seed normal operation of the system or it may be provided to the user.

User data recovery flow 700 uses the same methodology as primary code generation—which means that the binary user data is not stored on the system, and may only be generated by supplying the correct biometric information. This feature of the present invention is intended primarily to recover user binary data that is of the type "something the user knows" and may have been forgotten by the user.

Figure 4:
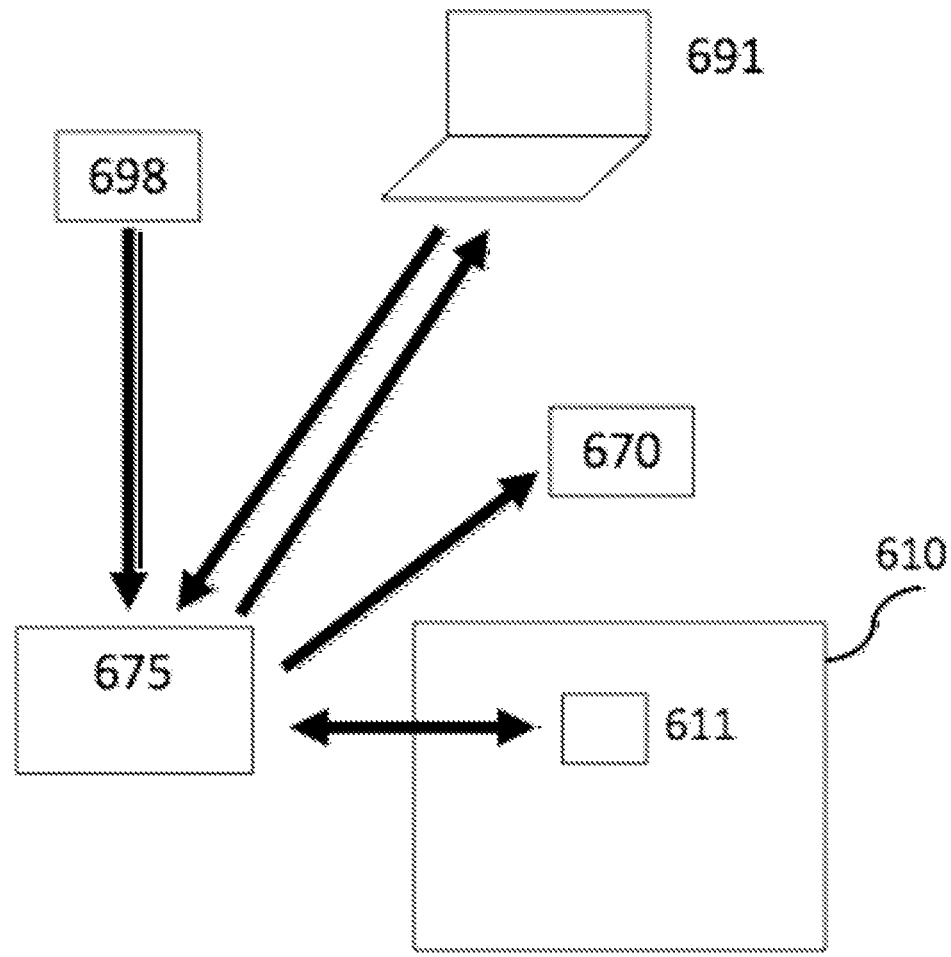
FIG. 4 is a functional block diagram of a security device implementing the method of the present invention for user data retrieval.

Referring now to FIG. 4, a block diagram of the additional components in a software or hardware implementation of the user data recovery feature is depicted. Biometric input device 698 is used to capture user biometric information. For storage of the recovery data, user input means 691 captures the binary user data. User biometric information and binary user data are passed to user data recovery module 675. User data recovery module 675 generates the required secure recovery data and stores it in local filesystem 610, in configuration file 611 or another similar file.

When user data recovery is required, biometric input device 698 captures the user biometric information, and passes it to user data recovery module 675. User data recovery module 675 retrieves secure recovery data from local filesystem 610, and algorithmically regenerates the original binary user data. This binary user data may be passed by user data recovery module 675 directly to initialization front-end 670, passed to user input means 691, or displayed for the user.

Although the present invention has been described in terms of the presently preferred embodiments, it is to be understood that the disclosure is not to be interpreted as limiting. Various alterations and modifications will no doubt become apparent to those skilled in the art after reading the above disclosure. Accordingly, it is intended that the appended claims be interpreted as covering all alterations and modifications as fall within the true spirit and scope of the invention.

What is claimed is:

1. A computer-implemented security method for securing data and logins comprising:
    capturing user biometric data;
    transforming the captured user biometric data;
    generating a random primary code through algorithmic manipulation of the transformed user biometric data;
    generating a protected secure code through algorithmic manipulation of the transformed user biometric data and the random primary code;
    generating secure credentials using the random primary code, site or application identifying data, and captured user data;
    dynamically generating data protection encryption keys using said random protected secure code, file identifying data, and user data;
    dynamically generating without storing all keys, credentials, and random primary codes; and
    using the data protection encryption keys to encrypt, when writing, or to decrypt, when reading, at-rest data files or in-motion data streams.

2. A computer-implemented security method for managing and providing user credentials comprising:
    using application software initiated during system startup for intercepting password requests from browsers or local applications and collecting site, application and user specific data;
    generating credentials for a web site or local application by generating a primary code through algorithmic manipulation of transformed user binary data without storage of said input user binary data;
    generating a protected secure code through algorithmic manipulation of the transformed user binary data and the random primary code;
    generating secure credentials using said primary code, site or application identifying data, and user data;
    dynamically generating data protection encryption keys using said secure primary code, file identifying data, and user data;
    dynamically generating without storing all keys, credentials, and primary codes;
    transparently encrypting data on write, and transparently decrypting data on reads using raw data, file-specific information and user-specific information; and
    using the data protection encryption keys to encrypt, when writing, or to decrypt when reading, at-rest data files or in-motion data streams.

3. The computer-implemented security method as in claim 2 wherein said primary code, said generated credentials, and other keys and cryptographic data are not stored, either locally or in a cloud repository.

4. The computer-implemented security method as in claim 2 wherein intercepting password requests is done by a browser plugin.

5. The computer-implemented security method as in claim 2 wherein intercepting password requests is done by a system agent.

6. The computer-implemented security method as in claim 2 wherein intercepting password requests is done by a device driver.

7. The computer-implemented security method as in claim 2 wherein intercepting password requests is done by a stand-alone application.

8. The computer-implemented security method as in claim 2 wherein the method steps are implemented in software.

9. The computer-implemented security method as in claim 2 wherein the method steps are implemented in hardware and firmware.

* * * * *